United States Patent [19]
Saito et al.

[11] Patent Number: 5,293,494
[45] Date of Patent: Mar. 8, 1994

[54] PERSONAL COMPUTER FOR SETTING, IN A SOFTWARE SETUP OPERATION NORMAL/REVERSE DISPLAY, CONNECTION OF AN EXTERNAL DEVICE, AND AN AUTOMATIC DISPLAY OFF FUNCTION

[75] Inventors: Toshimitsu Saito, Fuchu; Junko Konno, Oome, both of Japan

[73] Assignee: Kabushiki Kaisha Toshiba, Kawasaki, Japan

[21] Appl. No.: 29,963

[22] Filed: Mar. 9, 1993

Related U.S. Application Data

[63] Continuation of Ser. No. 541,948, Jun. 22, 1990, abandoned.

[30] Foreign Application Priority Data

Jun. 23, 1989 [JP] Japan .................................... 1-62233
Jun. 23, 1989 [JP] Japan .................................... 1-162232

[51] Int. Cl.$^5$ .......................... G06F 13/00; G06F 1/26
[52] U.S. Cl. .................... 395/275; 395/106; 395/156; 395/700
[58] Field of Search ............... 395/109, 156, 275, 700, 395/325

[56] References Cited

U.S. PATENT DOCUMENTS

| 4,604,690 | 8/1986 | Crabtree et al. | 395/700 |
|---|---|---|---|
| 4,733,351 | 3/1988 | Peirent | 395/144 |
| 4,974,151 | 11/1990 | Advani et al. | 364/200 |
| 4,979,107 | 12/1990 | Advani et al. | 364/200 |
| 4,980,836 | 12/1990 | Carter et al. | 364/483 |
| 5,014,193 | 5/1991 | Garner et al. | 364/200 |

OTHER PUBLICATIONS

T1200 Portable Personal Computer User's Manual—1987, pp. 4–18, 4–19 Toshiba.
T1600 Portable Personal Computer User's Manual, First Ed., Sep. 1988, pp. 4–30 Toshiba.
T3100e Portable Personal Computer Reference Manual, First Ed., Sep. 1988, Figs. 3A–3D, p. 3/9, Toshiba.
Jakopin, version 3.07, Aug. 1988 Computertechnik Kieckbusch GmbH "Steve".

*Primary Examiner*—Robert L. Richardson
*Attorney, Agent, or Firm*—Oblon, Spivak, McClelland, Maier & Neustadt

[57] ABSTRACT

A personal computer, wherein a setup processing is performed to select a display mode, either a normal-display mode or a reverse-display mode, and also to select one of the external devices such as a printer and an external floppy disk drive. Also, a display auto-off mode and a display auto-off period are set during the setup processing. A period is measured during which no data is input from a keyboard. When the measured time value exceeds the display auto-off period, the supplement of power to the back light is stopped automatically.

17 Claims, 17 Drawing Sheets

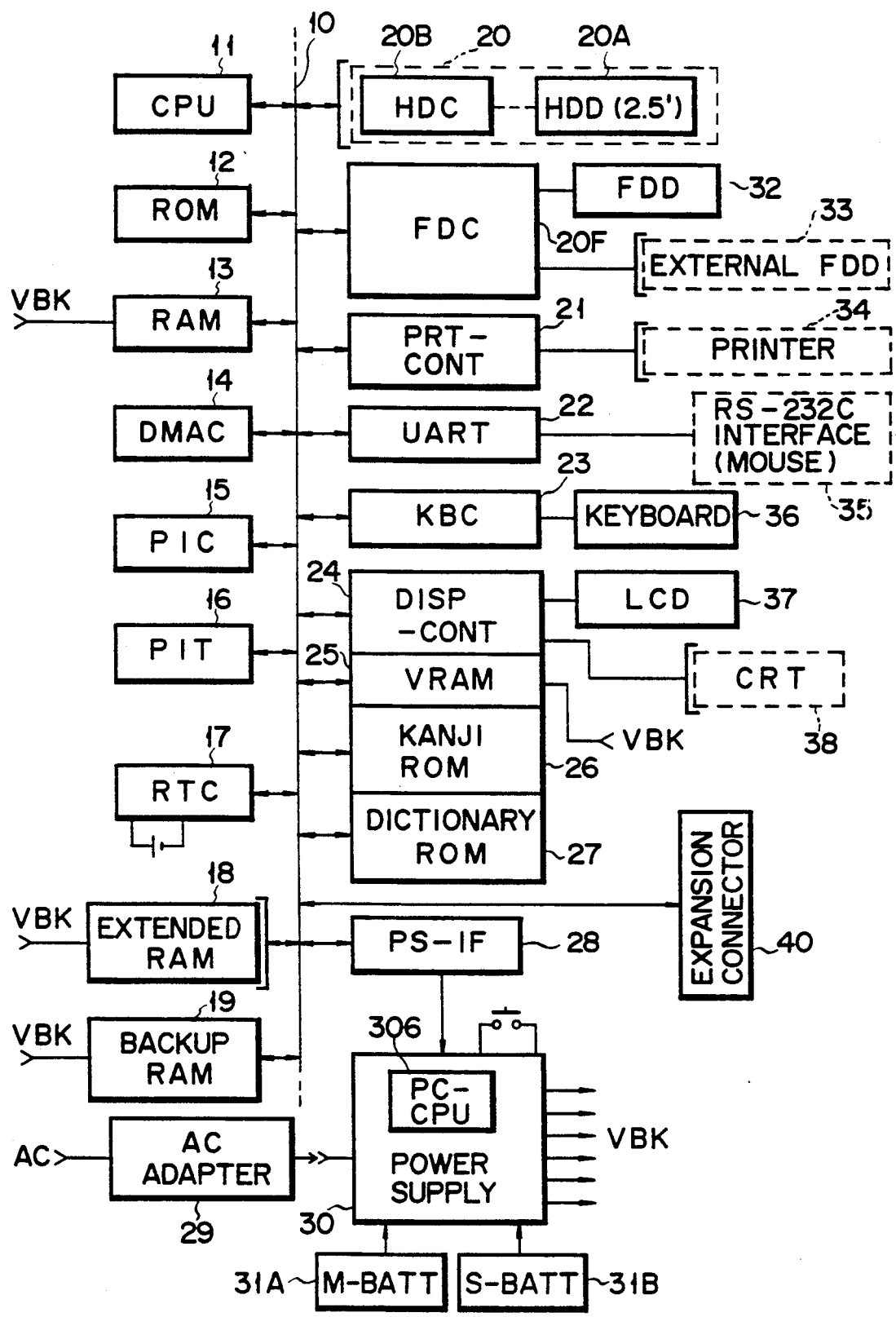
F I G. 1

```
[[SYSTEM SETUP]]--------------VERSION X.XX

1. HARD RAM SIZE                    = 0 KB
2. STANDARD MEMORY PORT ADDRESS      = 258 H
3. EXTENDING MEMORY PORT ADDRESS     = 208 H
4. RESUME FUNCTION                   = DISABLE
5. PRT-A-B                           = PRT
6. REVERSE DISPLAY                   = DISABLE
7. AUTO DISPLAY-OFF TIME             = DISABLE
8. DISPLAY MODE                      = CGA(80*25)
9. INCORPORATED RS-232C PORT         = COM 1
10. INCORPORATED MODEM               = ENABLE
11. INCORPORATED MODEM POWER         = OFF
12. LOW-BATTERY SPEAKER SOUND        = ENABLE
13. SYSTEM SPEAKER SOUND             = ENABLE
14. PRINTER PORT TYPE                = OUTPUT MODE

[↑↓ ENTER] ITEM CHANGE  [-] CONTENT CHANGE
[F1] COMPLETION  [F5] STANDARD SETTING
[F10] WRITE CHANGED CONTENTS
```

FIG. 10

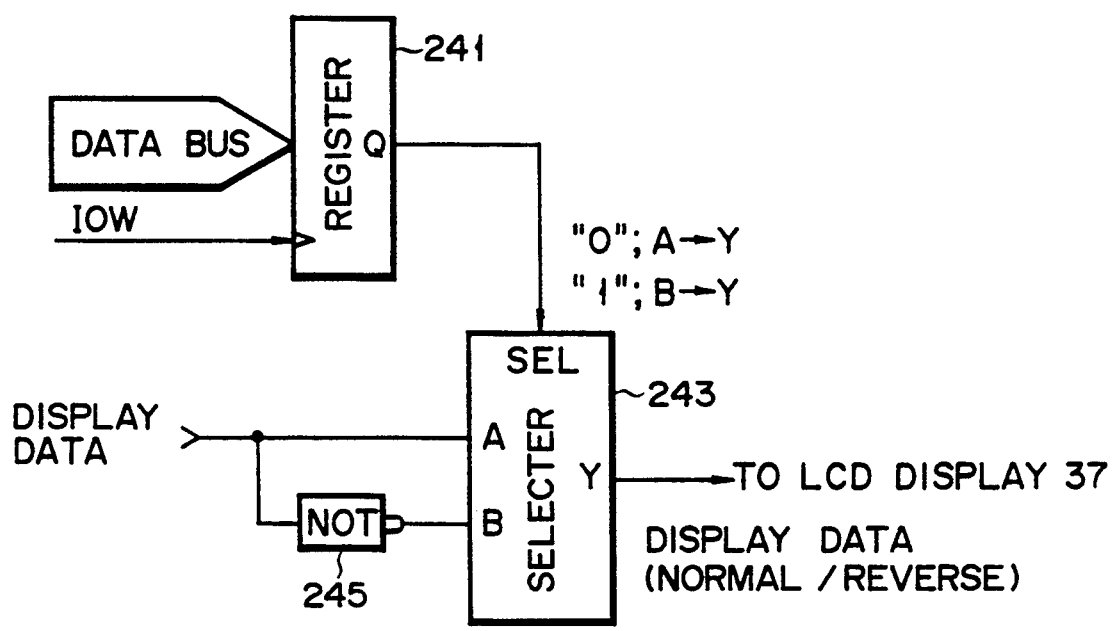
F I G. 11

```
[[SYSTEM SETUP]]-------------- VERSION X.XX

1. HARD RAM SIZE                        = 0 KB
2. STANDARD MEMORY PORT ADDRESS  = 258 H
3. EXTENDING MEMORY PORT ADDRESS = 208 H
4. RESUME FUNCTION                      = DISABLE
5. PRT -A-B                             = PRT
6. REVERSE DISPLAY                      = DISABLE
7. AUTO DISPLAY-OFF                     = ENABLE
8. DISPLAY MODE                         = CGA(80*25)
9. INCORPORATED RS-232C PORT            = COM 1
10. INCORPORATED MODEM                  = ENABLE
11. INCORPORATED MODEM POWER            = OFF
12. LOW-BATTERY SPEAKER SOUND           = ENABLE
13. SYSTEM SPEAKER SOUND                = ENABLE
14. PRINTER PORT TYPE                   = OUTPUT MODE

[↑↓ENTER] ITEM CHANGE [-] CONTENT CHANGE
[F1] COMPLETION  [F5] STANDARD SETTING
[F10] WRITE CHANGED CONTENTS
```

FIG. 12

PERSONAL COMPUTER FOR SETTING, IN A SOFTWARE SETUP OPERATION NORMAL/REVERSE DISPLAY, CONNECTION OF AN EXTERNAL DEVICE, AND AN AUTOMATIC DISPLAY OFF FUNCTION

This application is a continuation of application Ser. No. 07/541,948, filed on Jun. 22, 1990, now abandoned.

BACKGROUND OF THE INVENTION

1. Field of the Invention

The present invention relates to a personal computer which is portable and is capable of being driven by a built-in battery, and more particularly to a personal computer having a setup processing function, which has means for selecting and setting normal/reverse display and external units such as a floppy disk drive, a printer and the like, and which is adapted for an arrangement where a display section is provided having a specific function section such as a back light which necessitates a relatively large power.

2. Description of the Related Art

In recent years, a variety of portable, internal-battery-operable personal computers have been developed. Each of these computers has means for selecting and setting a normal/reverse display mode and external devices connected to the computer, from a view point of operability and functionality. In a prior art, the selecting/setting means is realized by manual switches which are arranged on the main body of the computer and positioned such that the operator can easily operate them. For this reason, a conventional personal computer is provided with many switches, resulting in complicated operations and hardware arrangement.

Furthermore, this type of personal computer must be operated not only with an AC adapter but by a built-in battery in order to ensure the usability irrespective of a place where it is used.

In order to satisfy such demand, a back-lit liquid crystal display (LCD) may be used. However, as is well known in the art, a back-lit LCD consumes a relatively large amount of power. Therefore, it is difficult to use the personal computer for a long time with only the use of a normal built-in battery. On the contrary, if a large-capacity built-in battery is used in order to satisfy this requirement, a weight of the built-in battery is increased, resulting in a decreased convenience of portability.

SUMMARY OF THE INVENTION

An object of the present invention is to provide a personal computer which excludes a switch for setting a normal/reverse display, a switch for setting external units and the like, and simplifies the operability and the hardware arrangement thereof by realizing the setting function in a set up processing.

Another object of the invention is to provide a portable and built-in battery operable personal computer which can extremely reduce, without decreasing the operability, a power dissipation of a display provided with a specific function section such as a back light which consumes relatively large power.

According to a first aspect of the invention, there is provided a personal computer having display modes of a normal-display and a reverse-display and performing a setup processing for setting a system environment, said computer comprising: means for selectively setting either the normal-display mode o the reverse-display mode in the setup processing, and means for controlling the normal display mode or the reverse display mode set by the setting means.

According to a second aspect of the invention, there is provided a personal computer capable of performing a setup processing for setting a system environment, said computer comprising: means for setting a connection status of a unit connected to said computer in the setup processing; and means for specifying the system environment based on data from said setting means.

According to a third aspect of this invention, there is provided a method of setting a normal-display mode or reverse-display mode in a personal computer which is provided with a display means having normal and reverse display modes and which performs a setup processing for setting a system environment, said method comprising the steps of: displaying, on a display unit a menu screen for selecting the normal-display mode or the reverse display mode in the setup processing; and selectively setting the normal-display mode and the reverse-display mode on the select menu screen.

According to a fourth aspect of this invention, there is provided a personal computer provided with a display means and an input means, and capable of performing a setup processing for setting a system environment, said computer comprising: means for setting a display auto-off mode during the setup processing; means for measuring a period of time during which said input means remains not operated after the display auto-off mode has been set; means for disabling a specific functional operation of said display means when the period of time measured by said time measuring means exceeds a predetermined value; and means for enabling the specific functional operation of said display means when said input means is operated while the specific functional operation is disabled.

According to a fifth aspect of the present invention, there is provided a personal computer having a display means and an input means, and capable of performing a setup processing for setting a system environment, said computer comprising: means for setting a display auto-off mode and an auto-off period in the setup processing; means for measuring a period of time during which said input means remains not operated after the display auto-off mode has been set; means for disabling specific functional operation of said display means when the period of time measured by the time measuring means exceeds the auto-off period; and means for enabling the specific functional operation of said display means when said input means is operated while the specific functional operation is disabled.

According to a sixth aspect of this invention, there is provided a method of automatically disabling a display of a screen for a personal computer having a display means and an input device, and capable of performing a setup processing for setting a system environment, said method comprising the steps of: a) displaying a setup menu screen, including a setting of the display auto-off mode, on said display means; b) setting the display auto-off mode; c) measuring a period of time for which said input means is not actuated after the display auto-off mode has been set; d) disabling a specific functional operation of said display means when the period of time measured exceeds a predetermined value; and e) detecting an input from said input means, while the specific function is disabled and enabling the specific functional operation of said display means.

According to a seventh aspect of this invention, there is provided a method of automatically disabling a display of a screen for a personal computer having a display means and an input means, and capable of performing a setup processing for setting a system environment, said method comprising the steps of: a) displaying a setup menu screen, including a setting of the display auto-off mode, on said display means; b) setting the display auto-off mode and an auto display-off period; c) measuring a period of time for which said input means is not actuated after the display auto-off mode has been set; d) disabling a specific functional operation of said display means when the period of time measured exceeds the auto display-off period; and e) detecting an input from said input means, while the specific function is disabled and enabling the specific fucntional operation of the display means in response to the input.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a system diagram showing an embodiment of a personal computer according to the present invention;

FIG. 10 is a diagram showing an example of the setup screen in the embodiment of the present invention;

FIG. 11 is a block diagram illustrating an arrangement of a normal/reverse display switching circuit incorporated in the computer;

FIG. 12 is a diagram showing a modification of the setup screen shown in FIG. 10.

DETAILED DESCRIPTION OF THE PREFERRED EMBODIMENTS

Figure 2:
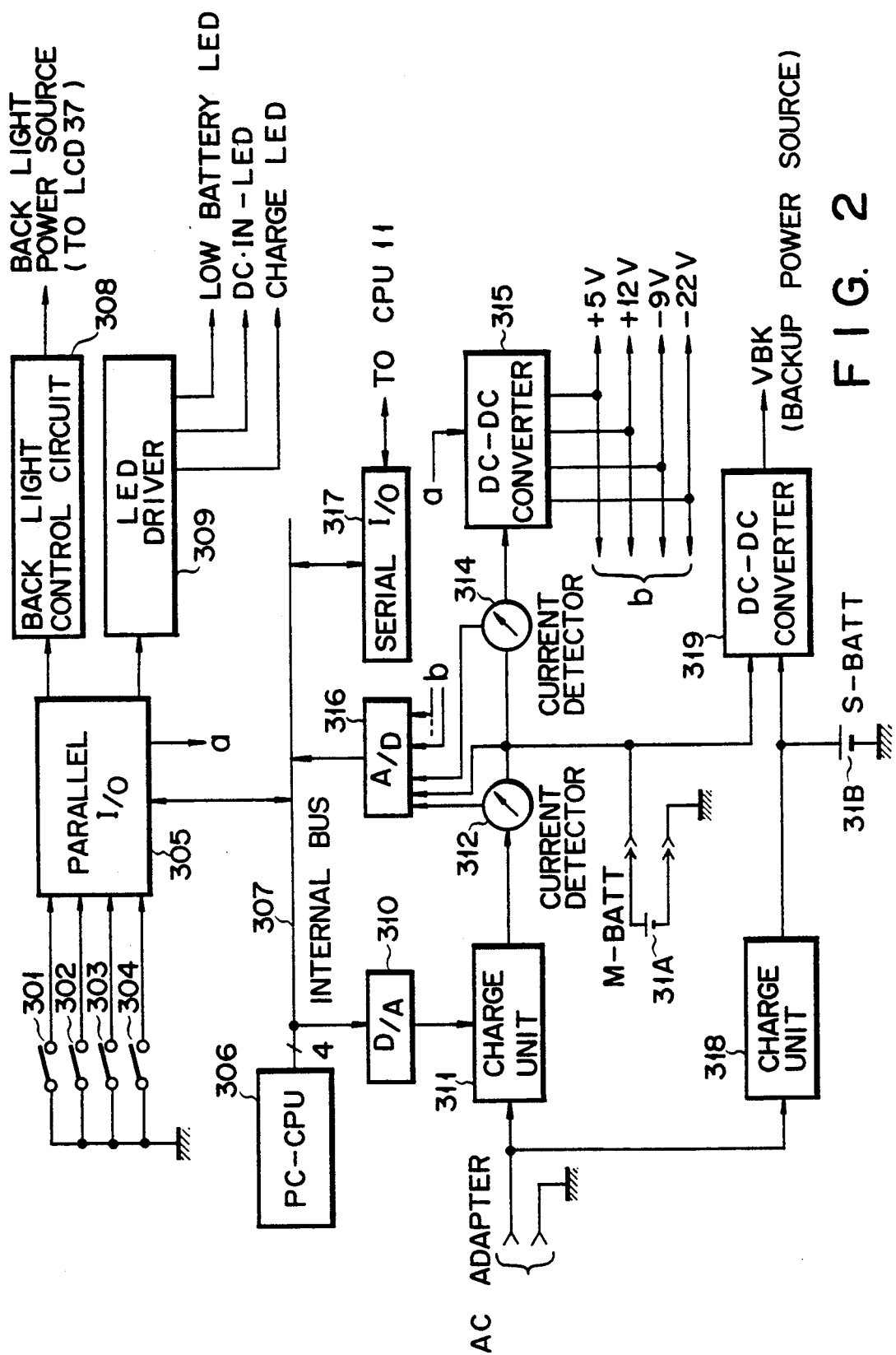
FIG. 2 is a block diagram showing the power-supply incorporated in the computer shown in FIG. 1.

FIG. 1 is a system diagram of an embodiment of a personal computer of the present invention, and FIG. 2 is a block diagram of a power-supply circuit 30 incoporated in the computer in FIG. 1.

As is shown in FIG. 1, the computer comprises a system bus 10 and components 11 to 17 connected to the bus 10. These components are: a main CPU (Central Processing Unit) 11, a ROM (Read Only Memory) 12, a RAM (Random Access Memory) 13, a DMAC (Direct Memory Access Controller) 14, a PIC (Programmable Interrupt Controller) 15, a PIT (Programmable Interval Timer) 16, and a RTC (Real Time Clock) 17.

The main CPU (Central Processing Unit) 11 controls an entirety of the system, and executes the various routines represented by the flow charts shown in FIGS. 3A and 3B, 4 to 7, and 8A through 8C. The main CPU 11 serves as a host CPU to the power control CPU incorporated in the power-supply circuit 30 to be described later.

The ROM 12 stores a basic input and output program (BIOS). The main CPU 11 executes the BIOS when the power switch of the computer is turned on to read the setup data stored in a specific area of the RAM 13 (or register) to determine the system environment, to further read a boot block from a floppy disk drive (FDD) 32, and to load an disk operating system (DOS) program stored in the FDD 32 into the RAM 13. The RAM 13 stores the DOS (Disk Operating System) program, the system programs shown in FIGS. 3A to 8C, application programs, and various data including setup data to be described later. Backup power VBK is supplied to the RAM 13 from the power-supply circuit 30. Hence, the data stored in the RAM 13 is not vanished even if the power switch of the computer is turned off.

The DMAC 14 performs a direct memory access control. The PIC 15 can be set by a program. The PIT 16 can be set by a program and supplies an interrupt signal to the main CPU 11 under control of the PIC 15 when its count reaches a value set by a program. In response to the interrupt signal, the main CPU 11 executes vector interrupt processing routine to thereby execute a routine of determining whether or not data has been input from a keyboard 36 within a predetermined time. If no data has been input within the predetermined time, the main CPU 11 will execute auto display-off routine which will later be described in detail. The RTC 17 is a timer module which has a dedicated built-in battery (not shown) and measures time; its output represents the present time.

As is shown in FIG. 1, the personal computer further comprises an extended RAM 18, a backup RAM 19, a hard disk pack 20, a floppy disc controller (FDC) 20F, a printer controller (PRT-CONT) 21, an I/O interface 22, a keyboard controller 23, a display controller 24, a video RAM 25, a Kanji ROM 26, a dictionary ROM 27, and a power-supply interface 28—all connected to the system bus 10.

The extended RAM 18 is a large-capacity memory removably inserted in the card slot formed in one side of the main body of the personal computer, and the backup power VBK is supplied to the extended RAM 18. The backup RAM 19 is also supplied with the backup power VBK and keeps storing the data required to perform a resume function. The hard disk pack 20 is removably set in a dedicated housing made in one side of the main body of the computer, and consists of, for example, a 2.5-inch hard disk drive (HDD) 20A and a hard disk controller (HDC) 20b. The floppy disk controller (FDC) 20F controls the floppy disk drive 32 and a external floppy disk drive 33 optionally connected to the personal computer. The printer controller 21 is connected to a printer 34 externally connected to the computer. The I/O interface 22 is a universal asynchronous receiver/transmitter (UART). If necessary, RS-232C interface units are connected to the I/O interface 22. The keyboard controller (KBC) 23 controls the keyboard 36. The display controller (DISP-CONT) 24 controls a liquid crystal display (LCD) 37 and the cathode-ray tube (CRT) 38 optionally connected to the personal computer. The controller 24 includes the normal/reverse display switching circuit illustrated in FIG. 11. The video RAM (VRAM) 25 is supplied with the backup power VBK and stores video data. The Kanji ROM 26 stores the patterns of Kanjis (Chinese characters) correspond to Kanji codes. The dictionary ROM 27 stores a table showing the correspondence between Kanjis and the corresponding spellings in Kanas (Japanese syllabics), which is used to convert words spelled in Kanas are converted to words spelled in Kanjis. The power-supply control interface (PS-IF) 28 connects the power-supply circuit 30 to the main CPU 11 through the system bus 10.

When necessary, an AC adapter 29 is plugged into the main body of the personal computer. It rectifies the commercially available AC power into a DC power of a predetermined voltage. An expansion connector 40 is connected at one end to the system bus 10. An expansion unit is selectively connected to the other end of the connector 40. The power-supply circuit 30 (an interlligent power supply) has a power control CPU (PC-CPU) 306, and will be described later with reference to FIG. 2. A main battery 31A, which is a chargeable battery pack, is removably mounted on the main body of the personal computer. A sub-battery 31B, which is also chargeable, is incorporated in the main body of the computer.

FIG. 2 is a block diagram illustrating the power-supply circuit 30 incorporated in the personal computer shown in FIG. 1. In FIG. 2, the circuit 30 has a power switch 301, a reset switch 302, a display switch 303, and a preparation completion set switch 304. The circuit 30 comprises a parallel I/O unit 305, a power control CPU (PC-CPU) 306, an internal bus 307, a backlight control circuit 308, an LED (Light-Emitting Diode) driver 309, a D/A converter 310, a charge unit 311, two current detectors 312 and 314, a DC-DC converter 315, an A/D converter 316, a serial I/O unit 317, a charge unit 318, and a DC-DC converter 319.

The switches 301 to 304 are connected to the parallel I/O unit 305, which holds the data items showing the on- or off-states of the switches 301 to 304 and also the data items set to the power control CPU 306.

The power control CPU (PC-CPU) 306 controls the power supply to all other components of the power-supply circuit 30, which require power. More specifically, the CPU 306 receives information of the respective components of the power-supply circuit 30 and an instruction from the host CPU 11 through the internal bus 307, and controls the power supplied to these, components in accordance with the instruction from the host CPU 11, and operational status of incorporated units and externally connected units. The power control CPU 306 has functions shown in the flow charts of FIGS. 7, and 8A to 8C.

The back-light control circuit 308 controls the back-light power supplied to the LC display 37, or the quantity of back light. More precisely, the circuit 308 supplies back-light power determined by adjusting the back light quantity controlling variable resistor (not shown), and stops supplying the back-light power to the LC display 37 under the control of the power control CPU 306 when the auto display-off mode is set in the setup display screen.

Figure 9A:
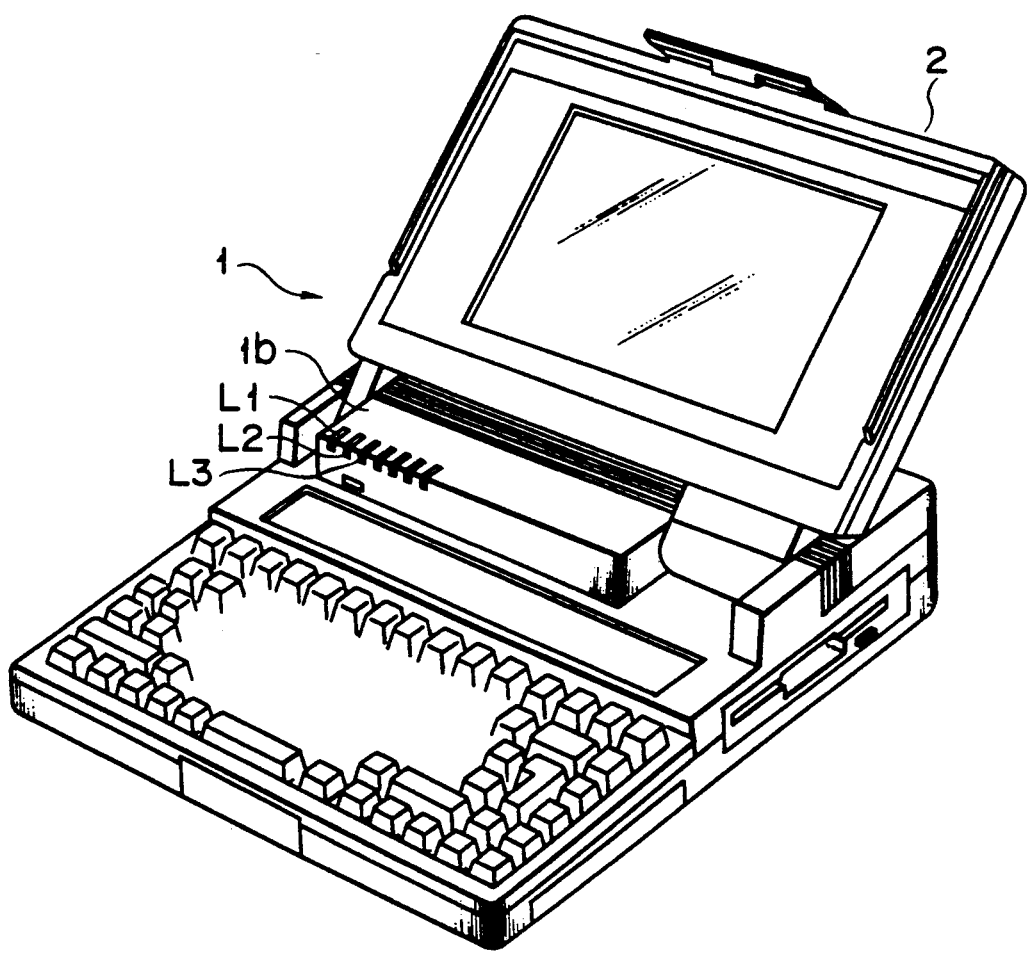
FIGS. 9A and 9B are perspective views showing an embodiment of the personal computer.
Figure 9B:
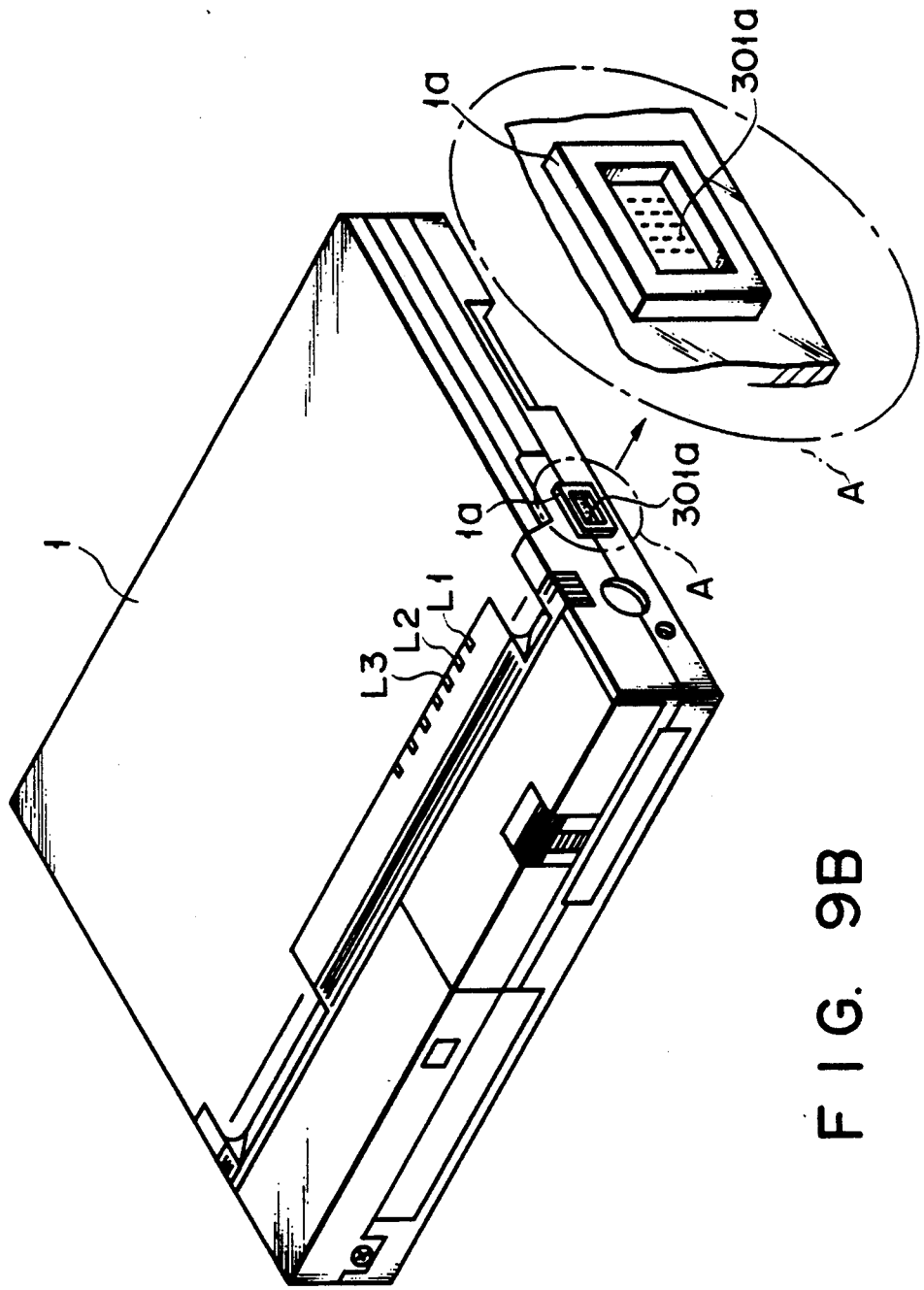

The LED driver 309 controls the ON and OFF of various LEDs including a power/speed LED L1, a low-battery LED L2 and an AC-adapter LED L3—all illustrated in FIGS. 9A and 9B—under the control of the power control CPU 306. Each of the LEDs consists of a dual-color type LED of red and green. The LED driver 309 turns LED L1 in green when the power switch is turned on and the computer operates on a high-speed clock signal, and turns LED L1 in red when the computer operates on a low-speed clock signal. The LED driver 309 flickers the LED L2 in red in a low battery state, and turns LED L2 in, orange (red+green) while the main battery 31A is being charged fast, and turns LED L2 in green when the charging operation is completed. Furthermore, the driver 309 turns LED L3 in red when the AC adapter 209 is effectively connected to the computer, and flickers LED L3 when the power supply circuit 30 is faulty while the AC adapter 29 is connected to the computer effectively.

The D/A converter 310 converts the charge control data, i.e., the digital data output from the power control CPU 306, into an analog signal, which is supplied to the charge unit 311. The unit 311 charges the main battery 31A in accordance with the charge control signal output from the D/A converter 310 under the control of the power control CPU 306. The current detector 312 detects a total current flowing in the computer, including the charge of current the main battery 31A. The current detector 314 detects the current (excluding the backup current) flowing in the circuits in the computer. The DC-DC converter 315 produces voltages for driving the components of the computer from the power supplied from the AC adapter 29 via the current detector 314, or the power supplied from the main battery 31A.

The A/D converter 316 converts the currents detected from the detectors 312 and 314, the voltage output from the main battery 31A, the voltages output from the DC-DC converter 315, and the like—all being analog values—to digital values. The digital values output from the A/D converter 316 are supplied to the power control CPU 306. The serial I/O unit 317 transfers data between the power control CPU 306 and the main CPU 11. The charge unit 318 charges the subbattery 31B. The DC-DC converter 319 converts the powers supplied from the batteries 31A and 31B to backup power VBK.

Figure 3A:
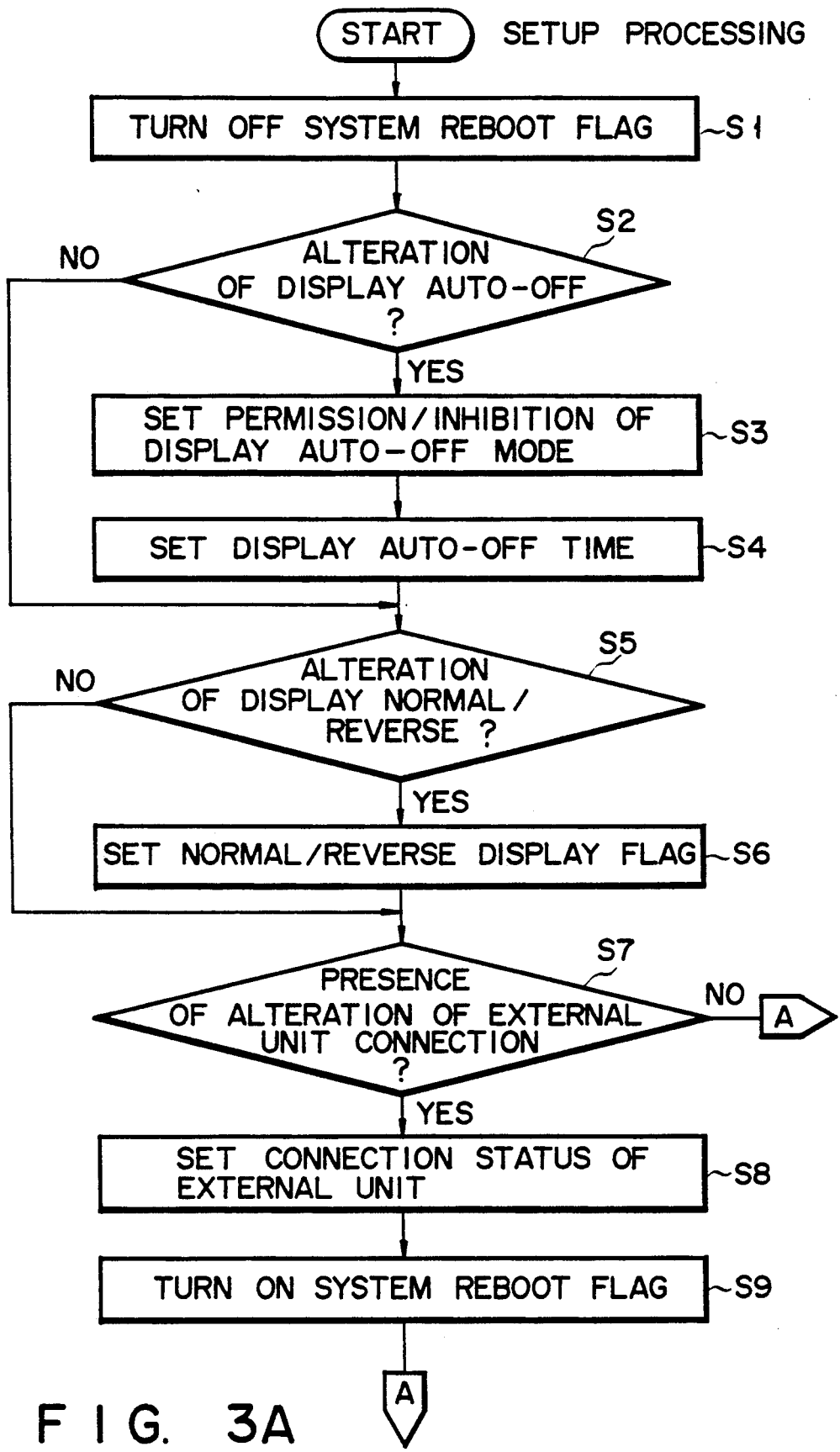
FIGS. 3A and 3B illustrate a flow chart representing the setup processing routine for the personal computer shown in FIG. 1.
Figure 3B:
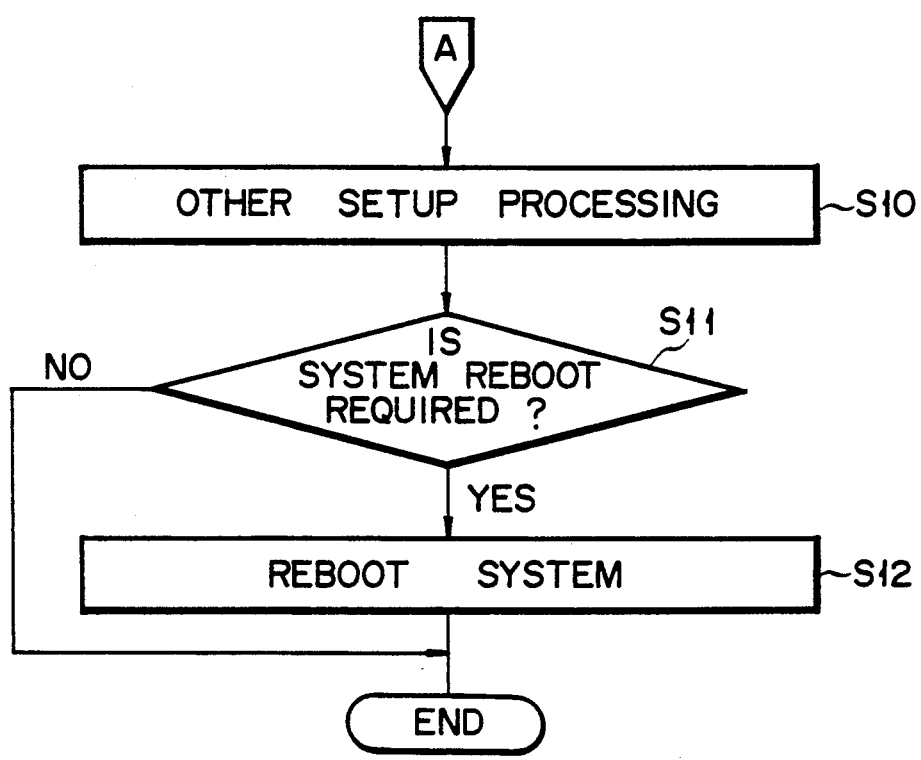
Figure 4:
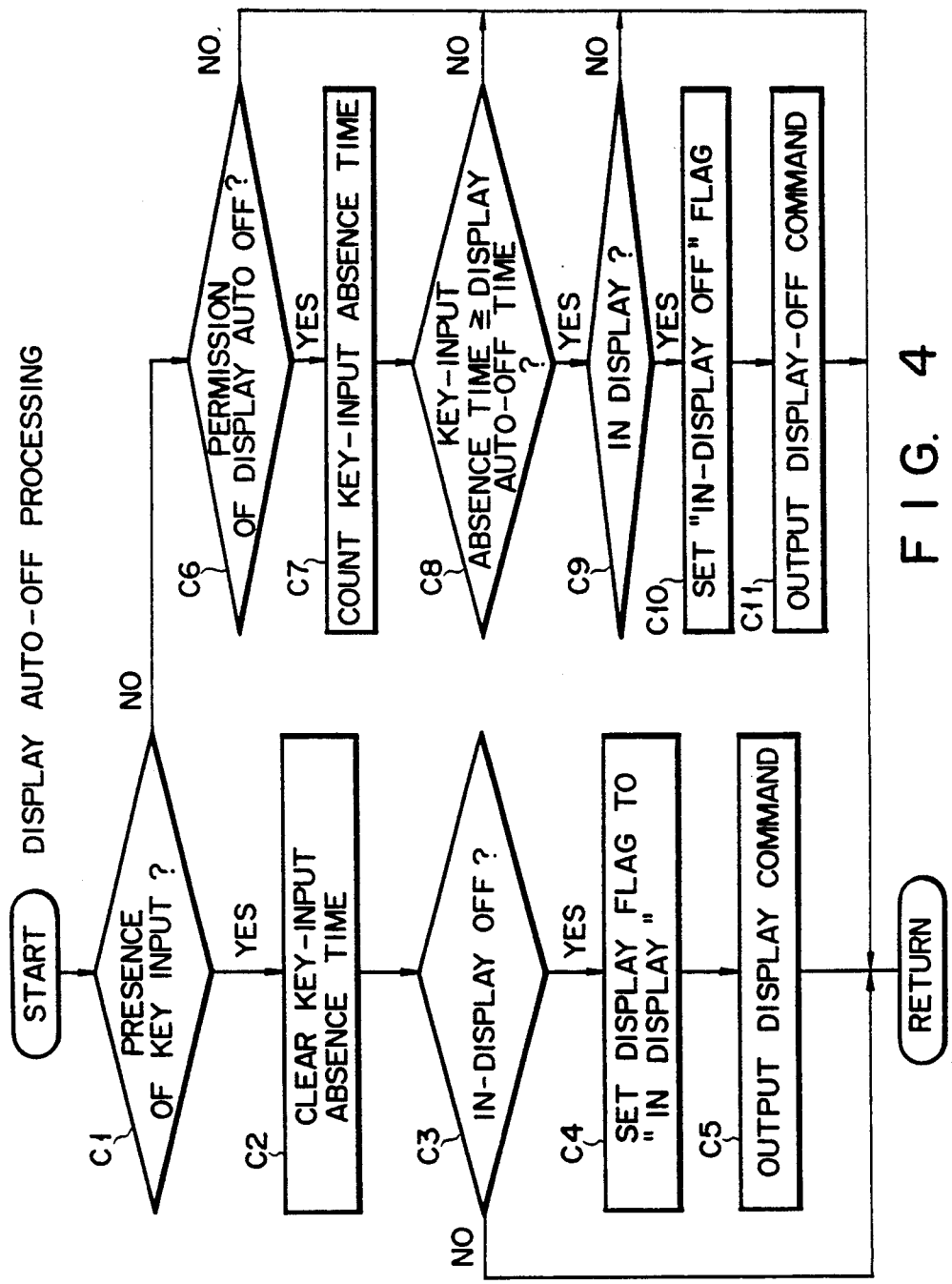
FIG. 4 is a flow chart explaining the auto display-off processing routine for the computer shown in FIG. 1.
Figure 5:
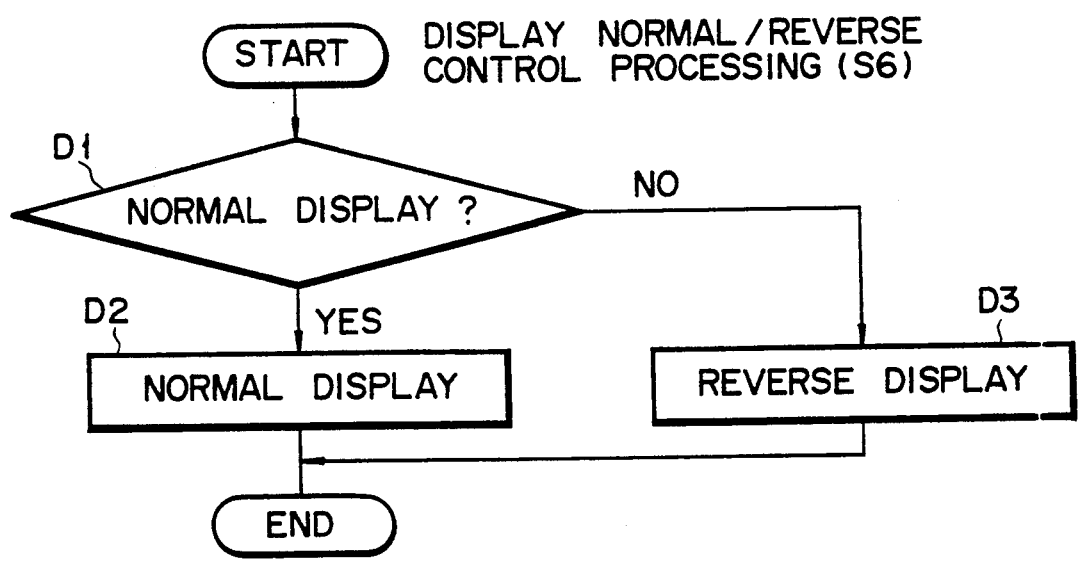
FIG. 5 is a flow chart showing the normal/reverse display processing routine for the computer shown in FIG. 1.
Figure 6:
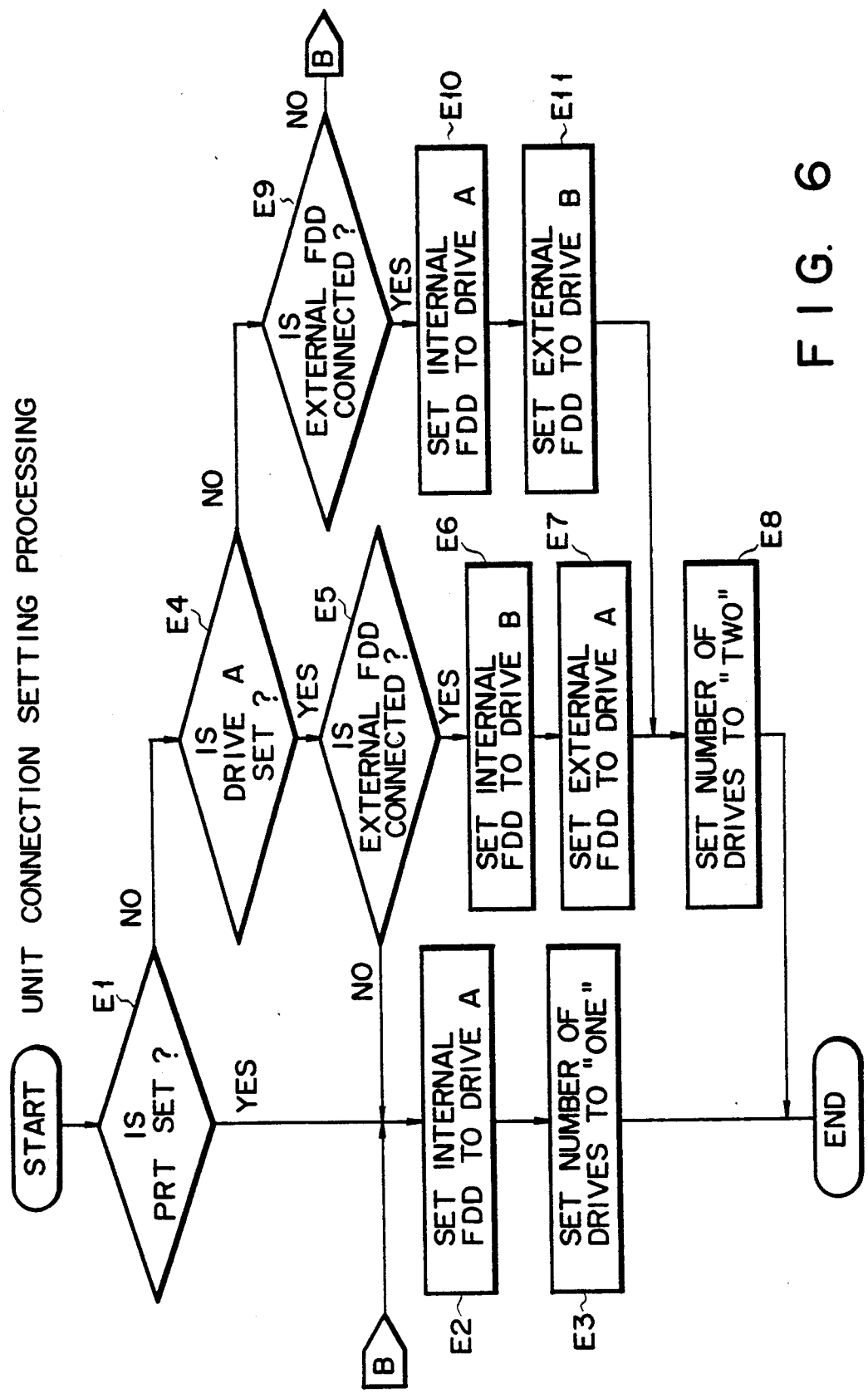
FIG. 6 is a flow chart showing the unit-connection status processing routine for the computer shown in FIG. 1.

FIGS. 3A and 3B form a flow chart explaining the setup processing routine executed under control of the main CPU 11. FIGS. 3 to 6 are flow charts explaining the routines of the setup processing and processings related to the setup processing. More precisely, FIG. 4 is a flow chart explaining the auto display-off routine; FIG. 5 is a flow chart representing the control of the normal/reverse display processing routine; FIG. 6 is a flow chart showing a unit connection (A-B-PRT) processing.

Figure 7:
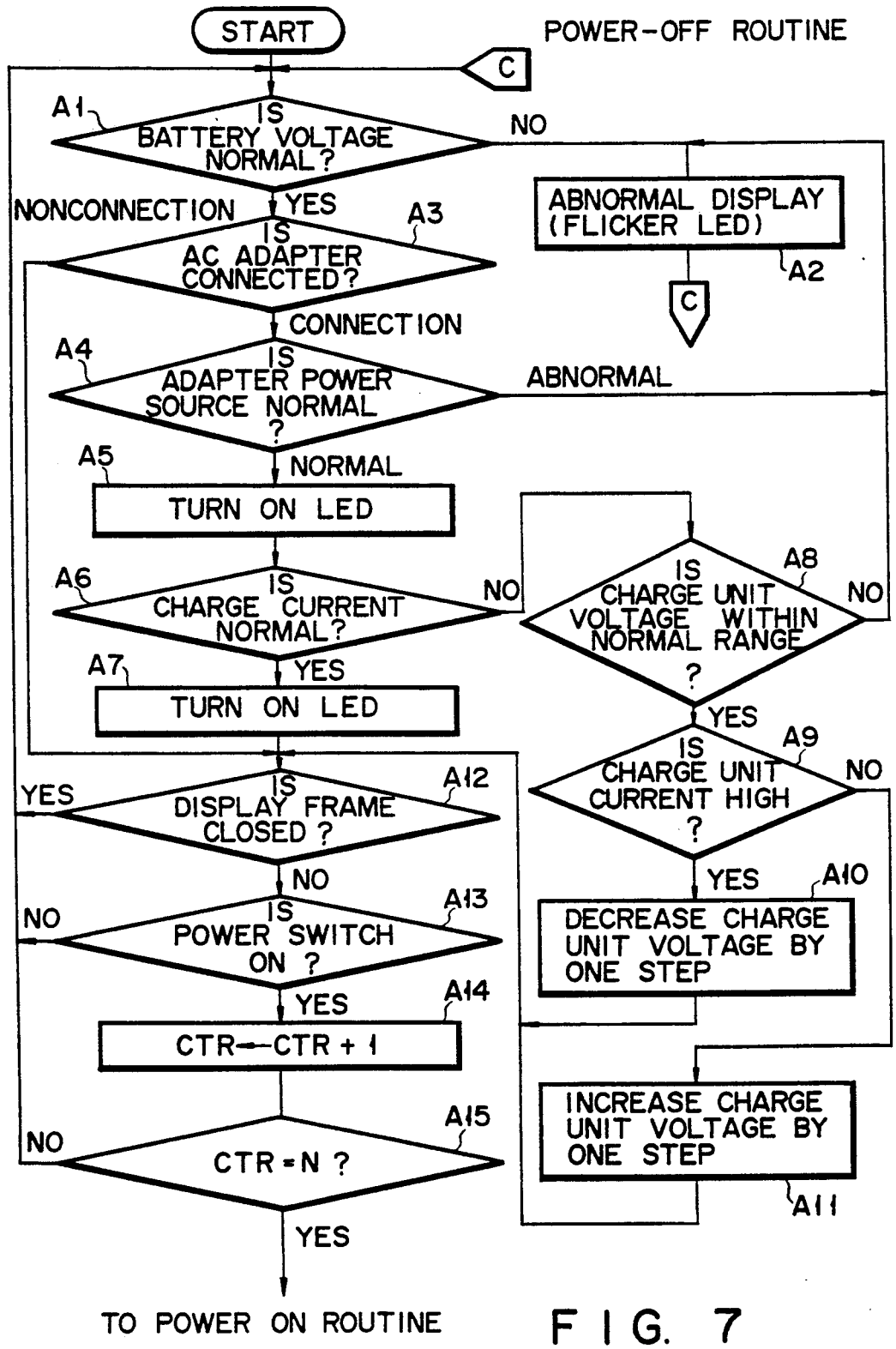
FIG. 7 is a flow chart showing the power-off processing routine executed by the power control CPU 306 incorporated in the computer shown in FIG. 1.
Figure 8A:
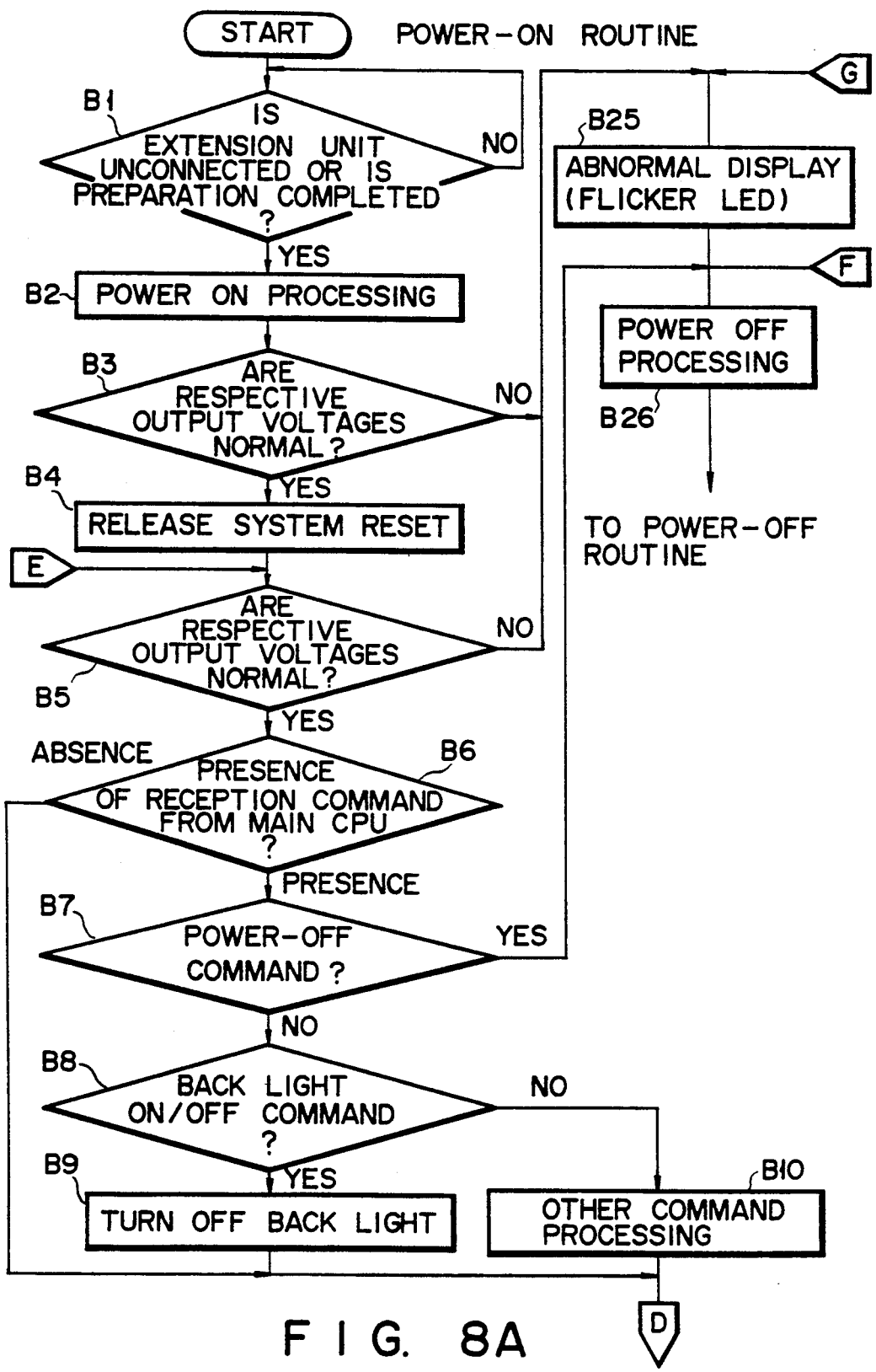
FIGS. 8A through 8C illustrate a flow chart showing the power-on processing routine executed by the power control CPU 306 used in the computer illustrated in FIGS. 1 and 2.
Figure 8B:
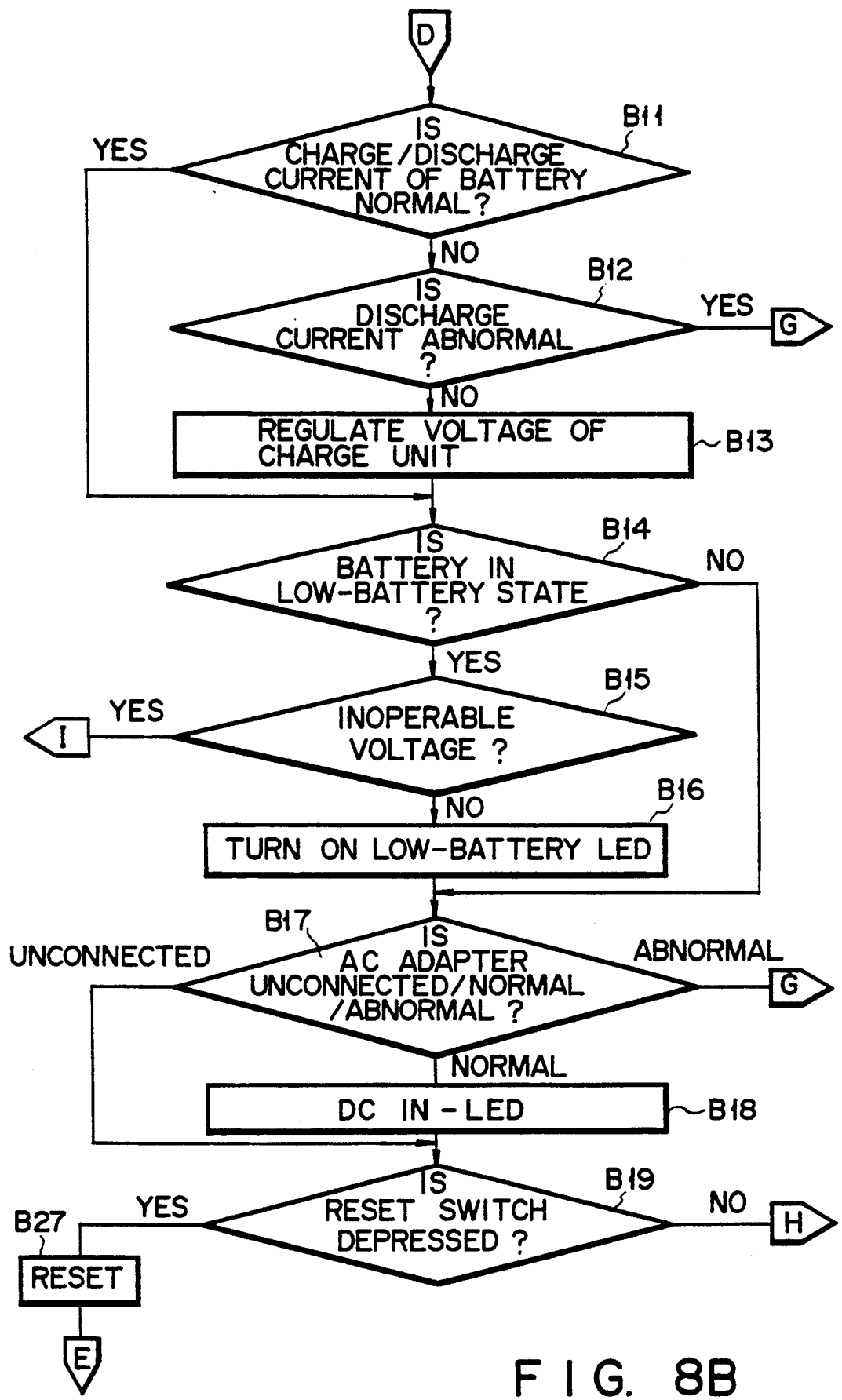
Figure 8C:
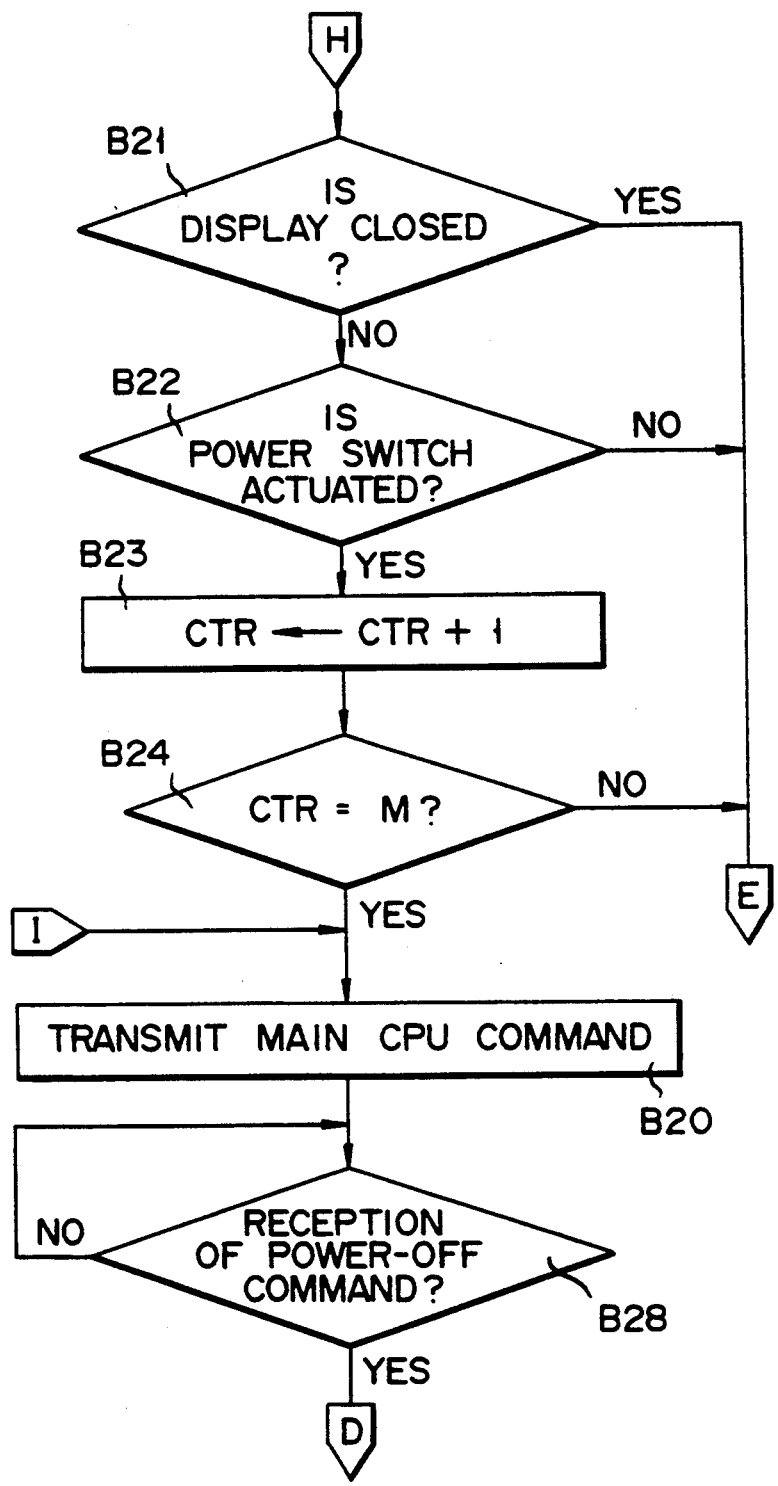

FIG. 7 is a flow chart showing the power-off operation of the power control CPU 306, and FIGS. 8A through 8C illustrate a flow chart showing the power-on operation of the power control CPU 306.

FIGS. 9A and 9B are perspective views showing an embodiment of the personal computer. To be more precise, FIG. 9A shows the computer with its display unit 2 held in an opened position, whereas FIG. 9B illustrates the computer with its display unit 2 held in the closed position. As is evident from FIG. 9B, a frame-like projection 1a protrudes from the side of the main body 1 of the computer, and surrounds the push button 301a of the power switch 301. The projection 1a prevents the button 301a from being depressed to turn on the switch 301 by accident while the computer is being transported from one place to another. Hence, the projection 1a is arranged to permit the switch 301 to be turned on only when the button 301a is depressed intentionally.

The LEDs L1, L2, L3 are provided within inverse L-shaped display windows arranged on an edge portion of and extending to upper and front wall sections of a rectangular-shaped projecting section 1b formed on the main body 1. Accordingly, the display states of the LEDs L1, L2, L3 can be seen not only when the display unit frame is opened, but also when the display unit frame is closed.

FIG. 10 shows an example of the setup screen in the above embodiment. FIG. 11 is a block diagram illustrating the normal/reverse display switching circuit incorporated in the personal computer. As is shown in FIG. 11, the display-mode switching circuit comprises a register 241, a selector 243 connected to the output of the register 241, and a NOT circuit 245 connected to one input of the selector 243. When "ENABLED" is input for "REVERSE DISPLAY" on the setup screen, the main CPU 11 sets a logic "1" in the register 241 and supplies an I/O write signal (IOW) thereto. When "DISABLED" is input for "REVERSE DISPLAY" on the setup screen, the CPU 11 sets a logic "0" in the register 241 and supplies an I/O write signal (IOW) thereto. The register 241 supplies logic "1" or "0" from its output terminal Q to the selector 243. In the meantime, display data is supplied to the first input terminal A of the selector and to the NOT circuit 245. The NOT circuit 245 inverts the data, and the inverted display data is supplied to the second input terminal B of the selector 243. Thus, the selector 243 outputs the display data to the LC display 37 when the input signal is logic "1," and the inverted display data to the LC display 37 when input signal is logic "0."

The operation of the embodiment of the invention, described above, will now be explained with reference to the drawings.

When the operator pushes the button 301a, thus turning on the power switch 301, main CPU 11 executes the BIOS stored in the ROM 12, whereby the CPU loads the boot block stored in the FDD 32 into the RAM 13. The CPU 11 executes the boot block to load the DOS program from the FDD 32 into the RAM 13. Then, the main CPU 11 executes the DOS program, and the operator operates the keyboard 36, inputting a setup command "SETUP."

In response to the setup command, the CPU 11 causes the LC display 37 to display the setup screen shown in FIG. 10, and then starts executing the setup processing routine as is shown in the flow chart of FIGS. 3A and 3B. As is shown in FIG. 10, various items are displayed in the setup screen, such as "hard RAM size", "standard memory port address", "extended memory port address", "resume function", "PRT-A-B", "reverse display", "display auto-off", "display mode", "incorporated RS-232C port", "incorporated modem", "incorporated modem power", "low-battery speaker sound", "system speaker sound", and "printer port type". The operator pushes the arrow-keys, thereby moving the cursor on the screen to the desired item displayed, then depresses the [-] key, and depresses character keys, thus inputting the characters or numerals and altering the item. If the operator pushes the F1 key, no items are altered, and the system setup routine ends. If the operator pushes the F5 key, default values are set. If the operator pushes the F10 key, the parameters set and displayed on the setup screen are finally fixed.

The setup items which are concerned with the present invention are: "PRT-A-B", "REVERSE DISPLAY", and "AUTO DISPLAY-OFF TIME". PRT, A, and B stand for a printer, a drive A and a drive B. As FIG. 1 shows, the personal computer has a port which enables either the external FDD 33 or the printer 34 to be connected to the computer. An operator connects the printer or the external FDD to the computer main body through the connector as the need arises. When the printer 34 is connected to the computer, the operator input "PRT" from the keyboard 36 on the setup menu screen. When the external FDD 33 is connected, the operator designates the drive A or B from the keyboard 36, as will be explained later in detail. When the reverse display is desired, "ENABLE" is input for the "REVERSE DISPLAY", and when the normal display is desired, "DISABLE" is input. As for item "AUTO DISPLAY-OFF TIME", the operator inputs a desired period of time if the operation wishes to have the supply of the back-light power, automatically stopped upon lapse of the desired period from the last inputting of data.

The setup processing routine will now be described in detail, with reference to the flow chart shown in FIGS. 3A and 3B.

In the first step, S1, the main CPU 11 turns off the system reboot flag, thus disabling system reboot. Otherwise, the CPU 11 will automatically reboot the system since the system reboot flag is on when the setup processing routine (FIGS. 3A and 3B) is completed. When the system is rebooted, the BIOS stored in the ROM 12 will be executed, and the parameters stored in the RAM 13 will be read out. To prevent the reading of these parameters, the system reboot flag must be turned off at first in the setup routine.

Then, in step S2, the CPU 11 determines whether or not the period of time set for the display auto-off has been altered. If NO, the flow proceeds to step S5. If YES, the flow goes to step S3, in which either a display auto-off enable flag or a display auto-off disable flag is set in a general register (not shown) incorporated in the RAM 13. The display auto-off mode is disabled if no period of time is set at all, and is enabled if any period of time is set. In step S4, the CPU 11 sets the period of time input by the operator, in the RAM 13.

In step S5, the CPU 11 determines whether or not the display mode has been altered, either from the normal-display mode to the reverse-display mode, or from the reverse-display mode to the normal-display mode. If NO, the flow goes to step S7. If YES, it goes to step S6, in which the CPU 11 sets the flag presenting the selected display mode in the general register of the RAM 13.

Next, in step S7, the CPU 11 determines whether or not an external unit is connected to the computer, instead of the unit previously connected thereto. If NO, the flow advances to step S10 of FIG. 3b. If YES, it proceeds to step S8, in which the flag representing the connection of the new external unit to the computer is set in the general register of the RAM 13. Then, in step S9, the CPU 11 turns on the system reboot flag.

Further, in step S10, the CPU 11 executes another setup routine. Then, in step S11, it determines whether or not it is necessary to reboot the system in accordance with the presence or absence of an external unit connected to the computer. That is, the CPU 11 finds it necessary to reboot the system if it has determined in step S8 that an external unit is connected to the computer. In step S12, the CPU 11 executes the BIOS stored in the ROM 12.

It will now be explained how the main CPU 11 executes the routine of automatically turning off the LC display 37, with reference to the flow chart shown in FIG. 4.

The routine represented by FIG. 4 is executed by using an interrupt processing while the CPU 11 is executing an application program. More specifically, the CPU 11 executes the routine shown in FIG. 4, by using the vector interrupt, in response to the time-out signal supplied from the PIT 16 shown in FIG. 1.

In step C1, the main CPU 11 determines whether or not data has been input from the keyboard 36. If NO, the flow advances to step C6, in which the CPU 11 determines whether the display auto-off mode is enabled nor not. If NO in step C6, the flow returns. If YES, the flow goes to step C7, in which the PIT 16 measures the time during which no data is input from the keyboard 36. In step C8, the main CPU 11 determines whether or not the count of the RTC 17 is greater than the display auto-off period set in the RAM 13 in step S4 (FIG. 3A). If YES, the flow proceeds to the next step C9, in which the CPU 11 determines whether or not data being displayed on the LC display 37. If YES in step C9, the CPU 11 sets an in-display off flag stored in the general register of the RAM 13. In step C11, the main CPU 11 supplies a display-off command through the system bus 10 and the power-supply control interface 28 to the power control CPU 306 incorporated in the power-supply circuit 30.

Upon receipt of the display-off command, the power control CPU 306 sets display-off data in the parallel I/O unit 305. As a result of this, the back-light control circuit 308 stops the supplement of power to the back-light lamp of the LC display 37.

If YES in step C1, that is, if data has been input from the keyboard 36, the main CPU 11 clears the counter in which the key-input absence time is stored. Then, in step C3, the CPU 11 determines whether or not the in-display off flag is set. If YES, the flow goes to step C4, in which the in-display off flag is turned off (that is, the in-display flag is set). In this case, the CPU 11 outputs a display command in step C5. Upon receipt of the display command, the power control CPU 306 supplies a display designation command to the parallel I/O unit 305. As a result, the back-light control circuit 308 supplies the back-light power to the LC display 37.

As has been described, when the display auto-off function is enabled and when the key-input absence time reaches the set time, the supplement of back-light power to the LC display 37 is stopped. The back-light lamp incorporated in the LC display 37 is thus turned off. When data is input from the keyboard 36 thereafter, the back-light lamp is turned on immediately, and thus the input operation is enabled. The display auto-off routine, thus performed, therefore save back-lighting power, successfully lengthening the lifetime of the main battery 31A.

If the main CPU 11 is to execute a demonstration program, wherein no data is input from the keyboard 36 at all, the display auto-off mode is disabled. Then, the LC display 37 keeps on displaying the demonstration data.

If the normal/reverse display mode is altered, CPU 11 determines whether the display mode selected is the normal-display mode or not in step D1 of FIG. 5. If YES, the CPU 11 causes the display controller 24 to control the LC display 37 so as to display data in the normal mode. If NO, the CPU 11 causes the controller 24 to control the LC display 37 so as to display data in the reverse mode. In the case of the reverse display, the display data is supplied to the LC display 37 after it has been inverted by the NOT circuit 245 used in the display controller 24.

With reference to the flow chart of FIG. 6, it will now be explained how the main CPU 11 performs an alteration processing of a unit externally connected to the personal computer.

First, in step E1, the CPU 11 determines whether or not the printer 34 has been designated. If YES, the CPU 11 sets the drive designation for the internal FDD to drive A in step E2, and then sets the number of drives to one in step E3. Since, according to the present invention, the printer 34 and the external FDD 33 are connected to the personal computer through a common connector, the external FDD 33 is not connected to the personal computer when the printer 34 is connected thereto. Accordingly, if the printer 34 is designated, only the internal FDD 32 can be used.

If NO in step E1, that is, if the printer 34 has not been designated, the main CPU 11 determines, in step E4, whether or not the drive A is designated. If YES, the flow goes to step E5, in which the CPU 11 determines whether or not the external FDD 33 is connected to the personal computer. If YES in step E5, the CPU 11 assigns the internal FDD 32 to drive B in step E6. Then, in step E7, CPU 11 assigns the external FDD 33 to drive A. In step E8, it sets the number of drives to two.

If NO in step E4, that is, if the drive A is not designated, the main CPU 11 determines, in step E9, whether or not the external FDD 33 is connected to the computer. If YES, the CPU 11 assigns the internal FDD 32 to drive A in step E10, and assigns the external FDD 33 to drive B in step E11.

When the connection of the external units to the computer is altered, the system is rebooted. More specifically, the CPU 11 reads the data ("A-B-PRT") set in the setup processing routine and representing the connection of the external units, and assigns usable floppy disk drive based on the FDD-connection condition represented by the data "A-B-PRT." (With the conventional percent computer of this type, in order to reboot the system, the operator needs to turn off the power switch, a unit connection (A-B-PRT) switch is actuated, and then the power switch is turned on again to reboot the system.)

As has been explained, the selecting and setting of the display mode, either the normal-display mode or the reverse-display mode, and the selecting and setting of the external units are accomplished in the setup processing routine. Therefore, the personal computer according to the invention requires neither a display-mode switch nor an external unit selection switch, and is thus more simple in structure than the conventional personal computer.

An operation of the PC-CPU 306 will now be described with reference to FIGS. 7, and 8A through 8C.

When the power-supply circuit 30 is OFF, the PC-CPU 306 determines, in step A1, whether or not the output voltage of the battery 31A is of a normal value. If NO, the flow goes to step A2. In step A2, the PC-CPU 306 supplies control data to the LED driver 309 through the internal bus and the parallel I/O unit 305, to thereby flicker LED L2 in red. If the output voltage of the battery 31A is of the normal value, the PC-CPU 306 determines, in step A3, whether or not the AC adapter 29 is connected to the charge unit 311. If NO, the flow goes to step A12. If YES, the flow advances to step A4, in which the PC-CPU 306 determines whether or not the output voltage of the AC adapter 29 is of a normal value. If NO, the flow goes to step A2, which the PC-CPU 306 causes the LED L2 to flicker in red. If the output voltage of the adapter 29 is of a normal value, the flow advances to step Ac, in which the LED L3 is turned on in red. Next, in step A6, the PC-CPU 306 determines whether or not the charge current of the charge unit 311 is of a normal value. The charge current may be determined from the difference between the readings of the current detectors 312 and 314. If the charge current is of an abnormal value in step A6 the PC-CPU 306 determines, in step A8, whether or not the output voltage of the charge unit 311 fall within a normal range. If this voltage falls outside the normal range, it is determined that the charge unit 311 is malfunctioning, and the flow returns to step A2. On the other hand, if the output voltage of the unit 311 falls within the normal range, the PC-CPU 306 determines, in step A9, whether or not the output voltage is too high. If YES in step A9, the output voltage of the charge unit 311 is reduced to a predetermined value in step A10. If NO in step A9, the voltage is increased to the predetermined value. Then, the flow advances to step A12.

If YES in step A6, that is, if the charge current of the battery 31A is of a normal value, the LED L3 is turned in red in step A7. In the next step, A12, the PC-CPU 306 determines whether or not the display unit 2 is in the closed position as is shown in FIG. 9B. If YES, the computer is automatically set in a power-off state, and the flow returns to step A1. If the display unit 2 is in an opened position as is shown in FIG. 9A, the flow goes to step A13, in which the PC-CPU 306 determines whether the power switch 301 is turned on or not. If YES, the value of a CTR counter is incremented by one, in step A14.

In step A15, the PC-CPU 306 determines whether or not the value of the CTR counter has reached a predetermined value N. If NO, the flow returns to step A1.

That the value of the CTR counter reaches the value N means the power switch 301 keeps its On state for a predetermined period. For this reason, if so, the PC-CPU 306 performs the power-on operation, as will be explained with reference to the flow chart of FIGS. 8A through 8C.

The PC-CPU 306 performs the power-on operation in the following way. First, in step B1, the PC-CPU 306 determines if the extension unit is unconnected, or if the connection of the extension unit has been completed to the expansion connector 40. If the extension unit is being connected to the extension connector 40, step B1 is repeated until the connection b is completed. If YES in step B1, the flow goes to step B2, in which the PC-CPU 306 causes the parallel I/O unit 305 to supply a signal Sa to the DC-DC converter 315, and the converter 315 to output four operation voltages, e.g., 5 V, 12 V, −9 V, and −22 V. Also in step B2, the PC-CPU 306 turns the LED L1 on, and clears the CRT counter.

In the next step, B3, the PC-CPU 306 determines whether or not the voltages output by the DC-DC converter 315 are of normal values. If NO, the flow proceeds to step B25, in which the LED L3 flickers in red. Then, in step B26, the DC-DC converter 315 is turned off, whereby the main power supply of the computer is turned off.

If YES in step B3, that is, if the voltages output by the DC-DC converter 315 are of normal values, the system reset is released in step B4, whereby the main CPU 11 actually starts operating. Since the load on the main power supply changes when the system reset is released, the PC-CPU 306 again determines, in step B5, whether or not the output voltages of the DC-DC converter 315 are of normal values. If NO in step B5, the flow goes to step B25 and then to step B26.

If YES in step B5, the PC-CPU 306 checks, in step B6, the presence of a command supplied from the main CPU 11 through the serial I/O unit 317. If there is not such a command, the flow goest to step B11. If there is such a command, the flow goest to step B7, in which the PC-CPU 306 determines whether this is a power-off command. If YES in step B7, the PC-CPU 306 turns off the DC-DC converter 315 in step B26. If NO in step B7, the PC-CPU 306 determines, in step B8, whether or not the command is a back-light on/off command. If YES, the PC-CPU 306 controls, in step B9, the back-light control circuit 308, thus starting the power supply to the backlight lamp when this is an on-command, or stopping the power supply when this is an off-command. If NO in step B8, that is, if the command is other than a backlight on/off command, the PC-CPU 306 processes the command in step B10.

Then, in step B11, the PC-CPU 306 determines whether or not the charge and discharge currents of the main battery 31A are of normal values. If YES, the flow advances to step B14. If NO, the fact that the discharge current is not of normal value is detected in step B12, and the flow goes to step B25 and then to step B26, whereby the main power supply of the computer is turned off. If the discharge current is not of a normal value, the PC-CPU 306 controls the D/A converter 310 to regulate the output voltage of the charge unit 311 in step B13.

Thereafter, in step B14, the PC-CPU 306 determines whether or not the output voltage of the main battery 31A is less than a reference value. If the output voltage is the reference value or more, the flow advances to step B17. If the output voltage of the battery 31A is less than the reference value (low battery) in step B14, the flow goes to step B15, in which the PC-CPU 306 determines whether or not the output voltage of the battery 31A is too low to operate the computer correctly. If YES in step B15, the flow goes to step B20, in which the PC-CPU 306 supplies a signal representing the low-battery condition, to the power-supply control interface 28 through the serial I/O unit 317. In response to this signal, the control interface 28 supplies a low-battery NMI signal to the main CPU 11.

If the output voltage of the main battery 31A is less than the reference value but high enough to operate the personal computer, the flow advances to step B16. In step B16, the PC-CPU 306 controls the parallel I/O unit 305 and the LED driver 309 to flicker the LED L2 in red.

In step B17, the PC-CPU 306 checks the status of the AC adapter 29. If the AC adapter 29 is not connected to the power-supply circuit 30, the flow goes to step B19. If the AC adapter 29 is connected to the circuit 30, and its output voltage is of an abnormal value, the flow jumps to the steps B25 and B26. If the AC adapter 29 is connected the circuit 30, and its output voltage is of a normal value, the flow goes to step B18, in which the LED L3 is turned in red.

In the next step B19, the PC-CPU 306 determines whether the reset switch 302 is ON or OFF. If the reset switch is ON the flow proceeds to step B27, in which the PC-CPU 306 sets the clear terminal of the main CPU 11 at a low level, thereby resetting the main CPU 11, through the serial I/O unit 307 and the power-supply control interface 28. Then, the flow goes to step B5. If NO in step B19, that is, if the reset switch 302 is OFF, the flow advances to step B21, in which the PC-CPU 306 determines whether o not the display unit 2 is in the closed position. If YES, the flow goes to step B5. If NO, the flows goes to step B22, in which the PC-CPU 306 determines whether the power switch 301 is ON or OFF. If OFF, the flow returns to step B5. If ON, the flow goes to step B23, in which the PC-CPU 306 increments the value of the counter CTR by one. Then, in step B24, the PC-CPU 306 determines whether the value of the counter CTR has reached a predetermined value M. If NO, the flow returns to step B5. If YES, the flow advances to step B20, in which the CPU 306 supplies a power-off command to the power-supply control interface 28 through the serial I/O unit 317. In response to this command, the control interface 28 outputs a power-off signal NMI to the main CPU 11.

In step B28, upon receipt of a power-off command supplied from the main CPU 11 through the serial I/O unit 317, the PC-CPU 306 clears the counter CTR, and drives the parallel I/O unit 305. The parallel I/O unit 305 generates the signal Sa, which is supplied the DC-DC converter 315. The DC-DC converter 315 is thereby turned off, and the supplement of power to the various components of the computer is stopped. However, the backup power VBK is continuously supplied to the components of the personal computer.

The present invention is not limited to the embodiment described above. In the above embodiment, not only "ENABLE", but also a display auto-off period is input in order to set the display auto-off mode. Instead, it may suffice to input "ENABLE" only as is shown in the setup display screen shown in FIG. 12, and the supply of back-light power will then be automatically stopped upon lapse of a predetermined fixed period starting with the last inputting of data from the keyboard 36.

Figure 13:
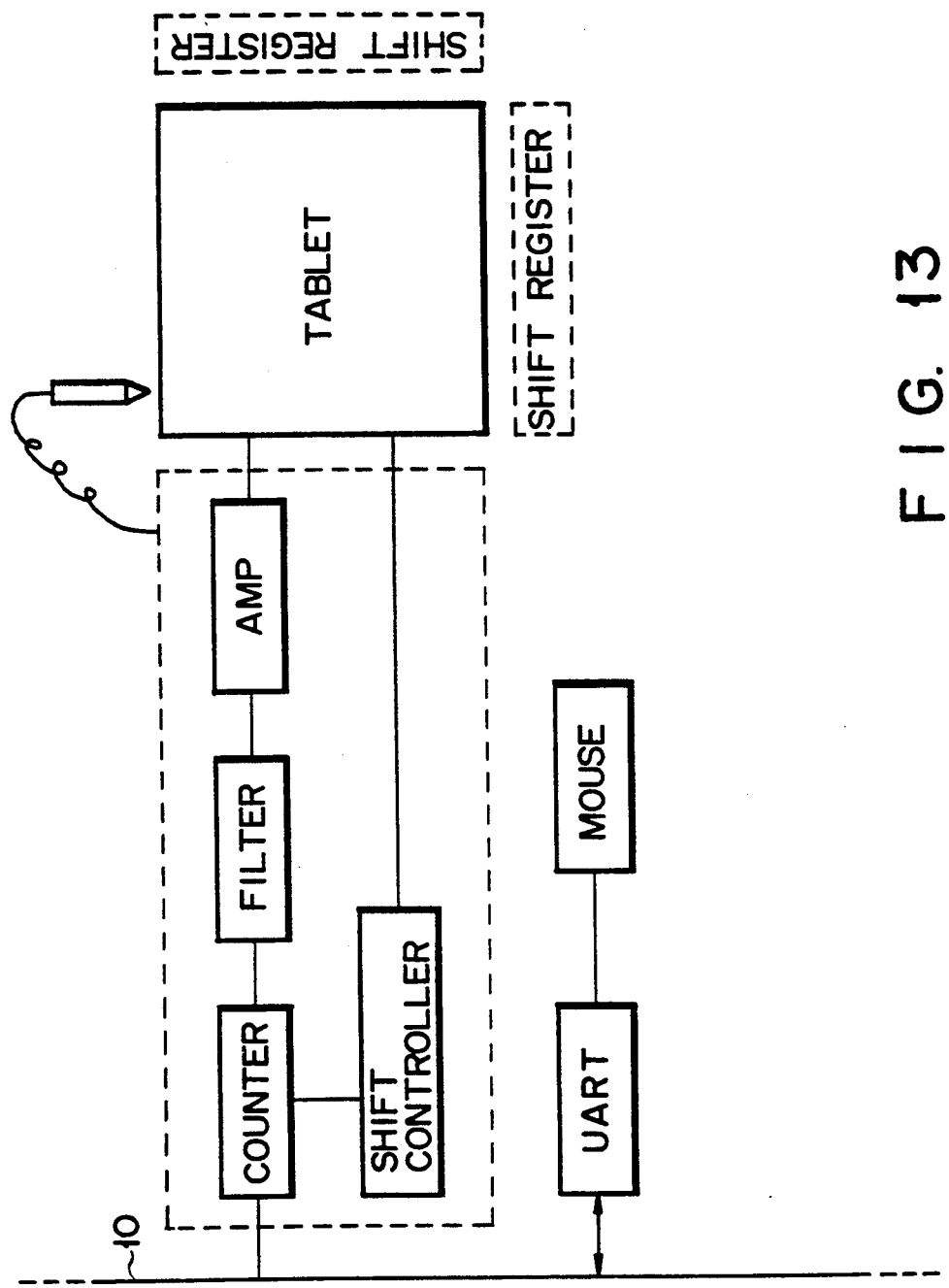
FIG. 13 is a block diagram showing a modification of the embodiment of the present invention.

Moreover, the supplement of back-light power may be stopped upon lapse of a predetermined period from the last inputting of data from an input device other than a keyboard, such as a mouse, a touch panel, or a hand-writing device of the type which has, as is shown in FIG. 13, a tablet and a controller, the keyboard 36.

Further, the supplement of power to the entire display unit 2, instead of the supplement of only backlight power, may be stopped upon lapse of a predetermined time from the last inputting of data.

Additional advantages and modifications will readily occur to those skilled in the art. Therefore, the invention in its broader aspects is not limited to the specific details, and illustrated examples shown and described herein. Accordingly, various modifications may be without departing from the spirit or scope of the general inventive concept as defined by the appended claims and their equivalents.

What is claimed is:

1. An information processing system including means for communicating address and data information in the system, means for supplying a driving power from a battery to the system, a memory, a peripheral device, means for accessing the peripheral device through the communicating means, coupled to the supplying means, for controlling the driving power to the peripheral device by using a setup utility stored in the memory, the controlling means comprising:

said memory including means for storing a power control interval, the interval representing an interval since the peripheral device has last been accessed;

means for executing the setup utility at a power-on of the system and displaying the stored power control interval;

means for selecting a power control interval of the system, coupled to the executing means;

means, coupled to the selecting means, for determining whether the selected power control interval is different from said stored interval;

means for writing the selected interval in the storage means, thereby updating the stored interval when the selected interval is different from the stored interval;

means for determining whether the peripheral device is being accessed;

means for counting an interval since the peripheral device has been last accessed when the determining means determines that the peripheral device is not being accessed; and means, coupled to the counting means, for outputting a power control signal to the peripheral device when the counted interval exceeds the stored power control interval.

2. The system according to claim 1, further comprising power supply means for supplying the driving power to the peripheral device.

3. The system according to claim 2, wherein the power supply means includes means for stopping the driving power to the peripheral device, in response to the power control signal.

4. The system according to claim 3, further comprising means for disabling the stopping means when the stored interval in zero.

5. The system according to claim 3, wherein the power control signal includes a display-off command for signalling said stopping means to stop the driving power to the display device.

6. The system according to claim 2, wherein the peripheral device includes a display device.

7. The system according to claim 6, further comprising:

means for determining whether the display device is supplied by the driving power supplied by the power supply means when a counted time exceeds the stored interval; and means for setting a display-off flag in the memory, when the display device is determined to be supplied by the driving power supplied by the power supply means.

8. The system according to claim 1, further comprising:

means for disabling a reboot of the system upon execution of the setup utility; and means for enabling a reboot of the system upon completion of the execution of the setup utility.

9. The system according to claim 1, further comprising means, coupled to the counting means, for clearing the counted time whenever the peripheral device is determined to be accessed.

10. A method for controlling a driving power to a peripheral device in an information processing system, comprising the steps of:

executing a setup utility stored in a computer memory at a power-on of the system and displaying a stored power control interval for the peripheral device, the power control interval representing an interval after which when the peripheral device is not accessed, the driving power to the peripheral device is not to be stopped;

selecting a power control interval for the system;

determining whether the selected interval is different from the stored interval;

when the selected interval is different from the stored interval, storing the selected interval in the memory to update the stored interval;

determining whether the peripheral device is being accessed and counting, when the peripheral device is not being accessed, an interval since the peripheral device has last been accessed; and outputting a power control signal to the peripheral device when the counted interval exceeds the stored interval, thereby controlling the driving power to the peripheral.

11. The method according to claim 10, further comprising the step of:

supplying the driving power to the peripheral device.

12. The method according to claim 11, further comprising the step:

stopping the driving power to the peripheral device, in response to the power control signal.

13. The method according to claim 12, further comprising the step of:

disabling the stopping step when the selected interval is zero.

14. The method according to claim 12, wherein when the power control signal includes a display-off command, the stopping step stops the driving power to the display device.

15. The method according to claim 11, further comprising the steps of:

determining whether the display device is being supplied with the driving power by the power supplying step when the counted time exceeds the stored interval; and setting a display-off flag in the memory, when the counted time is determined to exceed the stored interval and the display device is being supplied with the driving power.

16. The method according to claim 10, further comprising the steps of:

disabling reboot of the system upon execution of the setup utility; and enabling reboot of the system upon completion of the execution of the setup utility.

17. The method according to claim 10, further comprising the steps of:

clearing the counted time whenever the peripheral device is accessed.

* * * * *

UNITED STATES PATENT AND TRADEMARK OFFICE
CERTIFICATE OF CORRECTION

PATENT NO. : 5,293,494
DATED : March 8, 1994
INVENTOR(S) : Toshimitsu SAITO, et al.

It is certified that error appears in the above-indentified patent and that said Letters Patent is hereby corrected as shown below:

On the title page, Item [30], the 1st Foreign Application Priority Data should read as follows:

--Jun. 23, 1989 [JP]  Japan ............... 1-162233--

Signed and Sealed this

Nineteenth Day of July, 1994

Attest:

BRUCE LEHMAN

*Attesting Officer*          *Commissioner of Patents and Trademarks*